July 28, 1931.  A. A. HEINZ  1,816,580
BREATHER AND OVERFLOW DEVICE
Filed Dec. 10, 1928
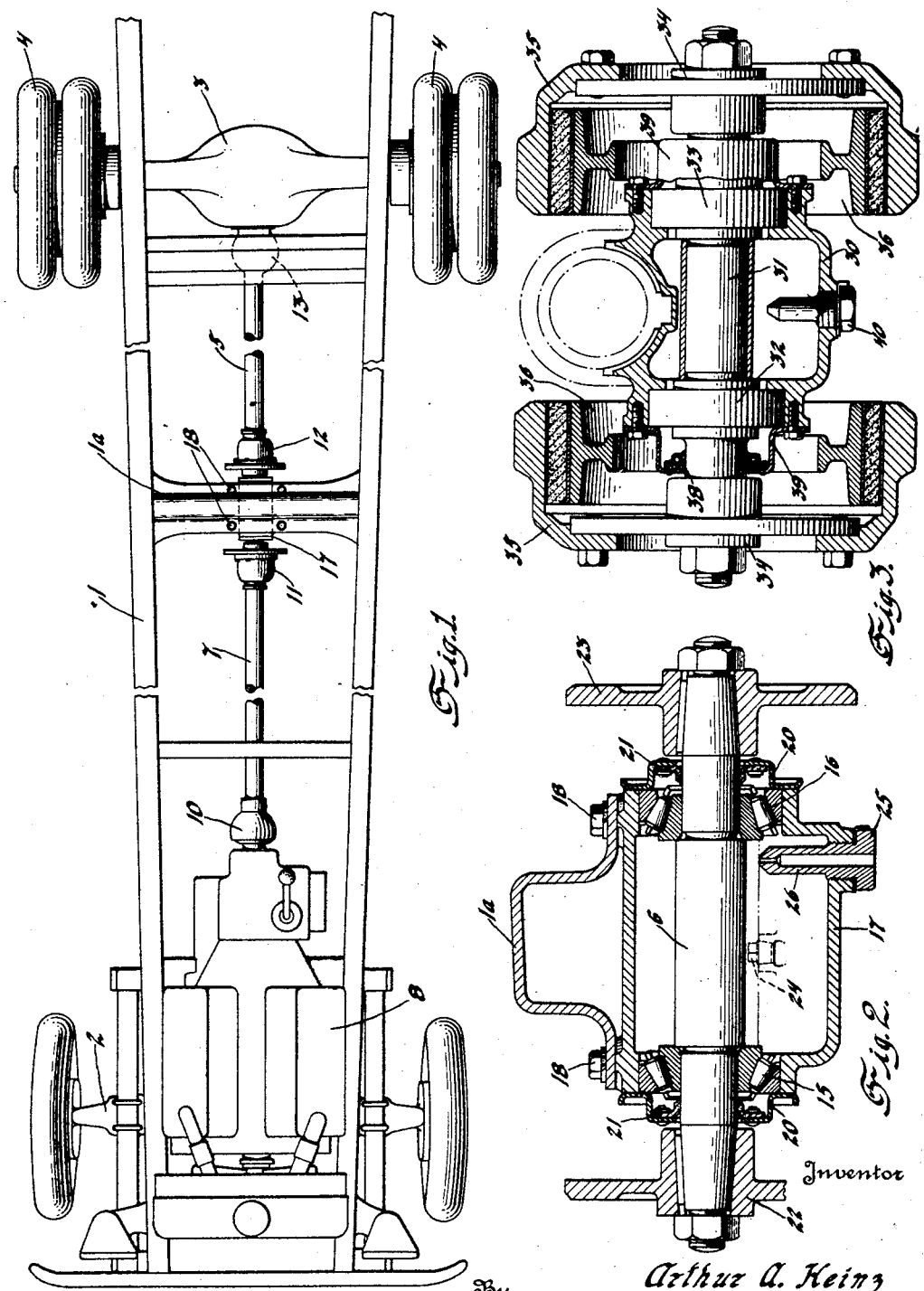

Patented July 28, 1931

1,816,580

UNITED STATES PATENT OFFICE

ARTHUR A. HEINZ, OF PONTIAC, MICHIGAN, ASSIGNOR TO YELLOW TRUCK & COACH MANUFACTURING COMPANY, OF PONTIAC, MICHIGAN, A CORPORATION OF MAINE

BREATHER AND OVERFLOW DEVICE

Application filed December 10, 1928. Serial No. 325,109.

This invention relates to motor vehicles and particularly to that type of vehicle, such as large buses and trucks, wherein the propeller shaft transmitting power from the engine to the driving wheels, because of the unusually large distance between the engine and driving wheels, is formed in sections, coupled together and supported between the engine and driving wheels in bearings carried by a housing that is suspended from the chassis frame.

It has been the practice to provide a center bearing housing in which is journaled a short coupling shaft connected through universal joints with the propeller shaft sections. Lubricant for the propeller shaft center bearing is supplied thru a filler opening to the housing, and one of the difficulties experienced is with leakage from the housing of the lubricating material along the coupling shaft and past the packing gaskets, where it is thrown or splattered about under influence of centrifugal action as the shaft rotates. Such swinging and splashing of the lubricant is highly objectionable in that among other things there results an accumulation of grease and grime on the floor of the body, the chassis and other associated parts. In the event brake mechanism is applied to the propeller shaft at this point, as is often the case, the braking action is destroyed or at least impaired by the lubricant thrown onto the friction surfaces.

In constructions heretofore employed, such leakage may be said to have insued or to have been accentuated, because the housing was filled too full with lubricant or because of the pressure that was built up when the lubricant and air within the housing expanded, as it was heated by friction set up by the moving parts, broke down the packing seal and allowed the lubricant to seep out along the surface of the shaft.

It is an object of the present invention to provide a simple and inexpensive bearing housing assembly which embodies an excess lubricant overflow and pressure relief vent, whereby superfluous lubricant will be expelled and the destructive action of pressure on the sealing gaskets will be eliminated and, consequently, leakage past the gaskets and, splattering of lubricant, reduced to a minimum.

Other objects and advantages will become apparent in the course of the following specification when taken in connection with the accompanying drawings, wherein Figure 1 is a top plan view of a chassis frame illustrating the application of the present invention. Figure 2 is a longitudinal sectional view of the propeller shaft center bearing and Figure 3 is a longitudinal sectional view illustrating a modification.

Referring to the drawings, the reference character 1 indicates a chassis frame suspended through the usual springs upon the front axle 2 and the rear axle 3. The road or driving wheels 4 on the rear axle shafts are driven through suitable differential mechanism by a propeller shaft, comprising sections 5, 6 and 7, from the engine or power plant 8, mounted in the front end of the chassis 1. Universal joints indicated at 10, 11, 12 and 13 connect the shaft sections with each other and with the engine 8 and the differential mechanism in the rear axle 3. The shaft sections 5 and 7 are preferably identical with each other so as to be interchangeable and thereby make for economy and convenience in manufacture and assembly. The center shaft section 6 coupling the sections 5 and 7 is mounted for rotation in suitable anti-friction bearings 15 and 16 at opposite ends of a housing or container 17, that is mounted as by means of bolts 18, to the transverse frame member 1a. Secured at each end of the housing 17 is a stamping 20 that serves to retain the bearing element 15—16 in place and also as a mounting for a resilient washer or packing gasket 21 having an inturned flange portion that wipes against the peripheral surface of the shaft 6 to seal against leakage of the lubricant from the interior of the housing 17. Keyed or splined on opposite ends of the coupling shaft 6, are the flanged hubs 22 and 23 respectively, to which the universal joints 11 and 12 are secured. Lubricant, such as oil or grease, is introduced into the hollow housing 17 through a filler opening that is normally closed by a plug 24 in the side wall of the housing, preferably to such level that the lower portion of the bearing elements 15 and 16 dip into the lubricant during the rotation of the shaft 6. Screw threaded in the bottom wall of the housing 17 is a hollow drain plug 25, the removal of which permits the draining and cleaning of the housing 17. An extension 26 of the drain plug projects upwardly within the housing and defines the proper level of the lubricant therein. The opening or vent provided by the hollow plug affords a breather passageway and prevents the possibility of pressures being built up within the housing, such as would be harmful or detrimental to the sealing action of the gaskets 21 and insures equalization of pressures inside and outside the housing. The hollow drain plug also affords an overflow for excess oil or grease, since if too much grease is poured into the housing, or in the event expansion of the lubricant body occurs, the excess finds its way out thru the plug rather than past the gasket. The discharged lubricant simply drops to the ground without being splattered about. While the gasket or packing washer 21 is one of the least expensive types on the market, it has been found to be long lived and most efficient in preventing lubricant leakage from the housing along the shaft so long as there is no pressure on the lubricant. In the present case, there is, of course, no building up of pressure and, therefore, the use of the gasket is not only permissible, but results in quite an advantage both from the standpoint of efficiency and cost.

In the modification illustrated in Figure 3, the housing 30 is adapted to be mounted on a tubular frame member and the coupling shaft 31 projecting through the housing and rotating in bearings 32 and 33, carries at each end a flanged hub 34 to which is secured a brake drum 35 having an internal expanding shoe 36 therein. A sealing gasket 38 carried by the bearing retaining member 39 hugs against the peripheral surface of the shaft to prevent leakage and swinging of grease on the braking surfaces. A hollow drain plug 40 in the bottom of the housing 30 controls the permissible height of the lubricant and vents the inside of the housing to atmosphere, whereby a differential in pressure between the inside and outside of the housing cannot occur and the sealing gasket is saved from harm and permitted to act most efficiently.

I claim:

1. A motor vehicle or the like, having in combination with a power plant and a drive axle, a propeller shaft assembly between the power plant and drive axle, including a pair of shaft sections and a coupling shaft between the sections, and a center bearing for the propeller shaft assembly including a hollow housing for lubricant and thru which the coupling shaft projects, a pair of anti-friction bearing elements for the coupling shaft adjacent opposite ends of the housing, means removably associated with the housing to retain the bearings in place, packing carried by said retaining means, adapted to hug the shaft to provide a seal against leakage of lubricant from said housing, and a hollow drain plug secured in the bottom of the housing to afford a vent opening and an overflow for excess lubricant, and having an upwardly projecting portion extending within the housing and defining the proper lubricant level.

2. A motor vehicle or the like, having in combination with a power plant and a drive axle, a propeller shaft assembly between the power plant and drive axle, including a pair of shaft sections and a coupling shaft between the sections, and a center bearing for the propeller shaft assembly including a hollow housing for lubricant and thru which the coupling shaft projects, a bearing element in said housing for the coupling shaft, a retainer for said bearing, a packing seal carried by the retainer for engagement with said shaft, and pressure relief means in said housing whereby the seal is saved from the action of pressure thereon.

3. A motor vehicle or the like, having in combination with a power plant and a drive axle, a propeller shaft assembly between the power plant and drive axle, including a pair of shaft sections and a coupling shaft between the sections, and a center bearing for the propeller shaft assembly including a hollow housing for lubricant and thru which the coupling shaft projects, a bearing for the shaft in said housing, the bearing surfaces between the shaft and housing being adapted to receive lubricant from the supply within the housing, a lubricant seal between the shaft and housing and combined vent and overflow means associated with the housing to automatically relieve pressure therein and prevent the supply of lubricant within the housing exceeding a predetermined level, whereby said seal may function free from abnormal operating conditions.

4. A motor vehicle or the like, having in combination with a power plant and a drive axle, a propeller shaft assembly between the power plant and drive axle, including a pair of shaft sections and a coupling shaft between the sections, and a center bearing for the propeller shaft assembly including a hollow housing for lubricant and thru which the coupling shaft projects, a pair of bearing elements for the coupling shaft adjacent opposite ends of the housing, a lubricant seal surrounding the shaft at each end of the housing, and means to relieve pressure within the housing so as to prevent its action on the seal.

5. A motor vehicle or the like, having in combination with a power plant and a drive axle, a propeller shaft assembly between the power plant and drive axle, including a pair of shaft sections and a coupling shaft between the sections, and a center bearing for the propeller shaft assembly including a housing in which the shaft has a bearing and which is adapted to contain a supply of lubricant for the bearing surfaces, brake mechanism carried by the coupling shaft adjacent said housing, a packing seal between the housing and shaft to prevent lubricant leakage from the housing along the shaft and into the brake mechanism, and pressure relief and lubricant overflow means associated with the housing to prevent the action of abnormal pressure on the seal which would destroy its effectiveness.

6. In a coupling device for propeller shafts or the like, a container for lubricant, a rotatable shaft projecting in the container, a bearing in the container in which the shaft is rotatable, a sealing washer wiping the shaft at the end of the container, and a hollow drain plug for the container providing a pressure relief vent and having an extension projecting to predetermined level in the container and thru which excess lubricant may overflow.

7. In a device of the character described, a shaft, a bearing for the shaft, having a lubricant cavity associated therewith to supply lubricant to the bearing surfaces, a wiper engaging the shaft to prevent the escape of lubricant from said cavity along the shaft, and a hollow drain plug for said cavity affording a combined overflow for superfluous lubricant, and a pressure relief to prevent pressure building up in said cavity and destroying the effectiveness of the wiper.

8. In a device of the character described, a housing adapted to contain lubricant, a shaft having a bearing in said housing, sealing means in wiping engagement with said shaft to hold the lubricant in said housing, and a combined overflow for superfluous lubricant and pressure relief means associated with the housing, whereby the effectiveness of the seal is not impaired by pressures inside the housing.

In testimony whereof I affix my signature.

ARTHUR A. HEINZ.